US008943598B1

(12) United States Patent
Kurian

(10) Patent No.: US 8,943,598 B1
(45) Date of Patent: Jan. 27, 2015

(54) AUTOMATIC COMPROMISE DETECTION FOR HARDWARE SIGNATURE FOR PAYMENT AUTHENTICATION

(71) Applicant: Bank of America Corporation, Charlotte, NC (US)

(72) Inventor: Manu Jacob Kurian, St. Louis, MO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/458,074

(22) Filed: Aug. 12, 2014

(51) Int. Cl.
G06F 17/00 (2006.01)
G06F 21/56 (2013.01)
G06F 21/52 (2013.01)

(52) U.S. Cl.
CPC .............. G06F 21/56 (2013.01); G06F 21/568 (2013.01); G06F 21/52 (2013.01)
USPC .................... 726/24; 726/22; 726/23; 726/29

(58) Field of Classification Search
CPC ........ G06F 21/56; G06F 21/568; G06F 21/52
USPC ................................................ 726/22–24, 29
See application file for complete search history.

(56) References Cited

U.S. PATENT DOCUMENTS

| 8,826,438 | B2 * | 9/2014 | Perdisci et al. ................. 726/24 |
| 2003/0074573 | A1 * | 4/2003 | Hursey et al. ................. 713/200 |
| 2006/0095971 | A1 * | 5/2006 | Costea et al. ................... 726/26 |
| 2007/0240222 | A1 * | 10/2007 | Tuvell et al. .................... 726/24 |
| 2008/0263677 | A1 * | 10/2008 | Kaditz et al. .................... 726/29 |
| 2009/0187963 | A1 * | 7/2009 | Bori ................................... 726/1 |
| 2009/0282485 | A1 * | 11/2009 | Bennett ............................ 726/24 |
| 2010/0058469 | A1 * | 3/2010 | Yen et al. ......................... 726/22 |
| 2011/0083184 | A1 * | 4/2011 | Upadhyay ....................... 726/24 |
| 2012/0260304 | A1 * | 10/2012 | Morris et al. ...................... 726/1 |
| 2012/0272320 | A1 * | 10/2012 | Rados et al. .................... 726/24 |
| 2013/0007883 | A1 * | 1/2013 | Zaitsev ............................ 726/24 |
| 2013/0227300 | A1 * | 8/2013 | Golovkin ...................... 713/188 |
| 2014/0007235 | A1 * | 1/2014 | Glenn et al. .................... 726/23 |
| 2014/0137249 | A1 * | 5/2014 | Johnson et al. ................. 726/23 |
| 2014/0165203 | A1 * | 6/2014 | Friedrichs et al. .............. 726/24 |
| 2014/0283003 | A1 * | 9/2014 | Nair et al. ....................... 726/12 |

* cited by examiner

Primary Examiner — Haresh N Patel
(74) Attorney, Agent, or Firm — Michael A. Springs; Moore & Van Allen PLLC; Patrick B. Horne

(57) ABSTRACT

Embodiments of the invention provide a method a authenticating a transaction at the point of transaction. In some embodiments of the invention, a unique signature is created based at least in part on a hardware profile of the system. In some embodiments, a request is received from a user to perform a transaction using the system. In some embodiments, in response to receiving the request the system may determine whether malware has compromised the signature creation algorithm, and if so, prevent the signature creation algorithm from creating a key based on the unique signature. Alternatively, if not, the system may allow the signature creation algorithm to create a key based on the unique signature.

20 Claims, 7 Drawing Sheets

US 8,943,598 B1

AUTOMATIC COMPROMISE DETECTION FOR HARDWARE SIGNATURE FOR PAYMENT AUTHENTICATION

BACKGROUND

In today's technological age, consumers may be prone to having their identity compromised due to the creation of malware and other detrimental computer programs. Accordingly, there exists a need for an improved system for detecting the presence of malware within computer systems. In particular, there exists a need for an improved system for providing payment authentication based on methods that protect the user's identity and payment credentials from exposure to malware.

BRIEF SUMMARY

Embodiments of the invention relate to apparatuses, methods, and computer program products for providing automatic compromise detection for hardware signature authentication algorithm. An exemplary system may comprise a computer apparatus including a processor and a memory, and a software module stored in the memory, comprising executable instructions that when executed by the processor cause the processor to create a unique signature based at least in part on a hardware profile of the system, and receive a request, from a user, to perform a transaction using the system. In some embodiments, in response to receiving the request, the system determine whether malware has compromised the signature creation algorithm, and if so, prevent the signature creation algorithm from creating a key based on the unique signature, and if not, allow the signature creation algorithm to create a key based on the unique signature.

In some embodiments, the signature creation algorithm is stored in the memory prior to creation of the unique signature and is protected, and thereby not writable, subsequent to being stored.

In some embodiments, the executable instructions when executed further cause the processor to determine that malware is present, and initiate one or more remediation actions configured to mitigate an impact of the malware or eliminate the malware.

In some embodiments, the executable instructions when executed further cause the processor to determine that malware is present, and initiate a malware presence communication, to the user and/or a second system, comprising an indication of the presence of malware on the system.

In some embodiments, determining whether malware has compromised the signature creation algorithm comprises monitoring whether any application or system has accessed the hardware profile of the system. If so, the system may determine whether the application or system that accessed the hardware profile was authorized to access the hardware profile. If so, the system may further determine that no malware has compromised the signature creation algorithm, and if not, determine that malware has compromised the signature creation algorithm. If not, the system may determine that no malware has compromised the signature creation algorithm.

In some embodiments, determining whether malware has compromised the signature creation algorithm comprises monitoring whether any application or system has accessed predetermined data stored in the memory of the system, and if so, determining whether the application or system that accessed the predetermined data was authorized to access the predetermined data. If so, the system may further determine that no malware has compromised the signature creation algorithm, and if not, determine that malware has compromised the signature creation algorithm. If not, the system may that no malware has compromised the signature creation algorithm.

In some embodiments determining whether malware has compromised the signature creation algorithm comprises monitoring whether any application or system has accessed a predetermined application or algorithm stored in the memory of the system, and if so, determining whether the application or system that accessed the predetermined application or algorithm was authorized to access the predetermined application or algorithm. If so, the system may further determine that no malware has compromised the signature creation algorithm, and if not, determine that malware has compromised the signature creation algorithm. If not, the system may determine that no malware has compromised the signature creation algorithm.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
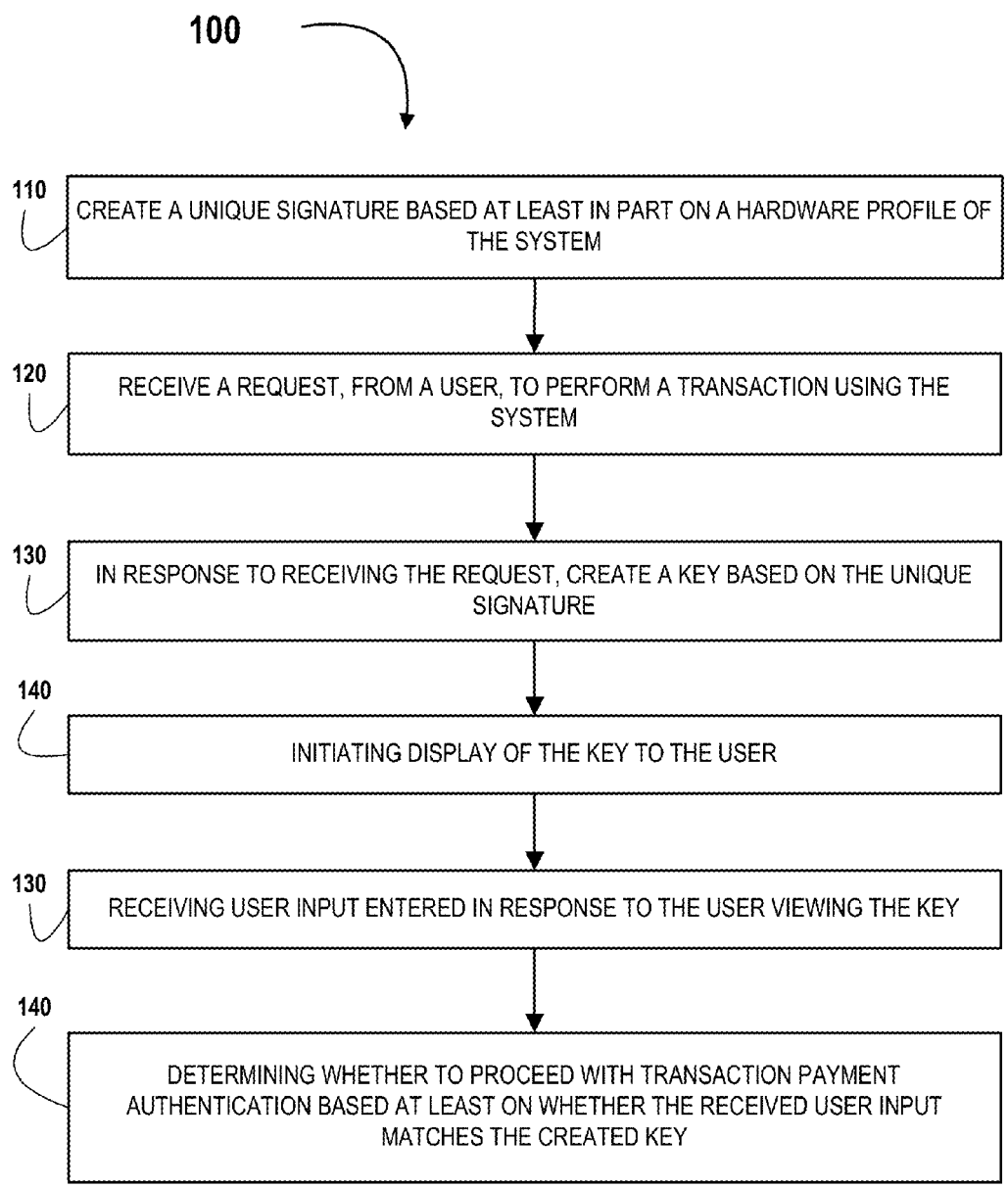
Figure 2:
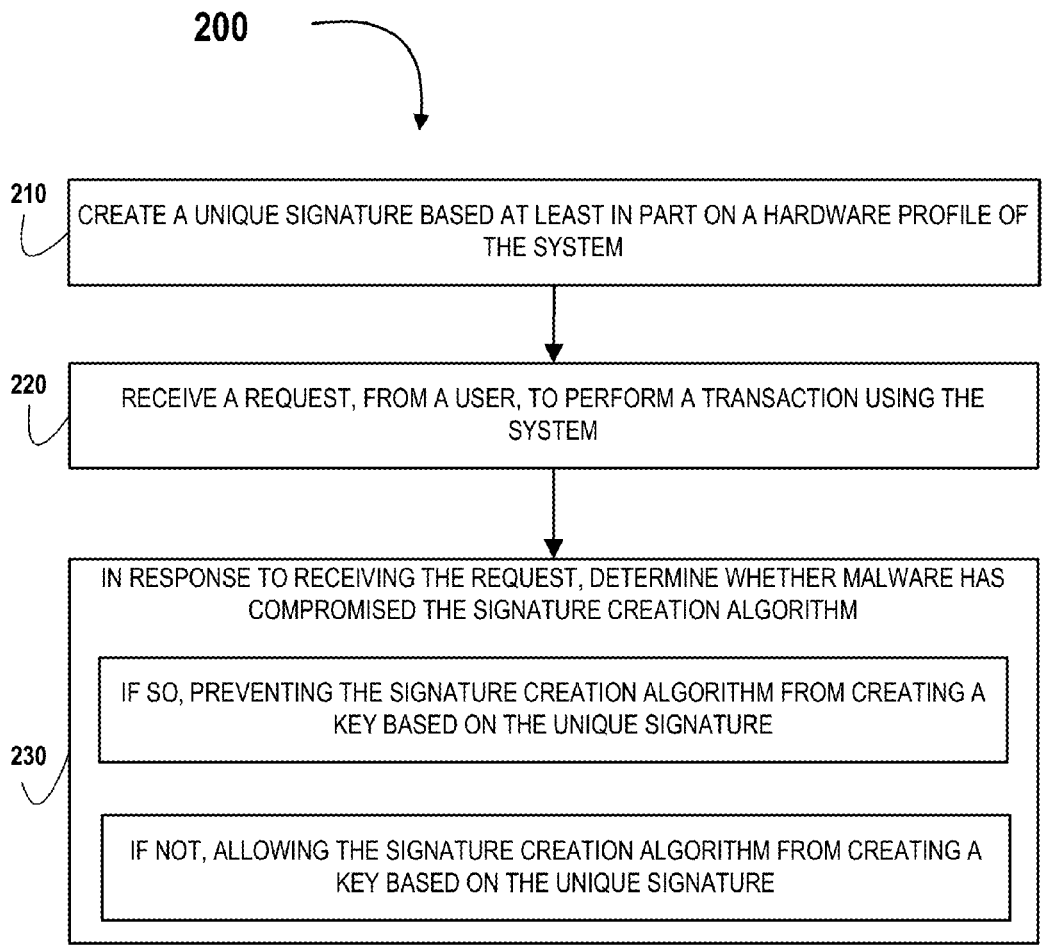
Figure 3:
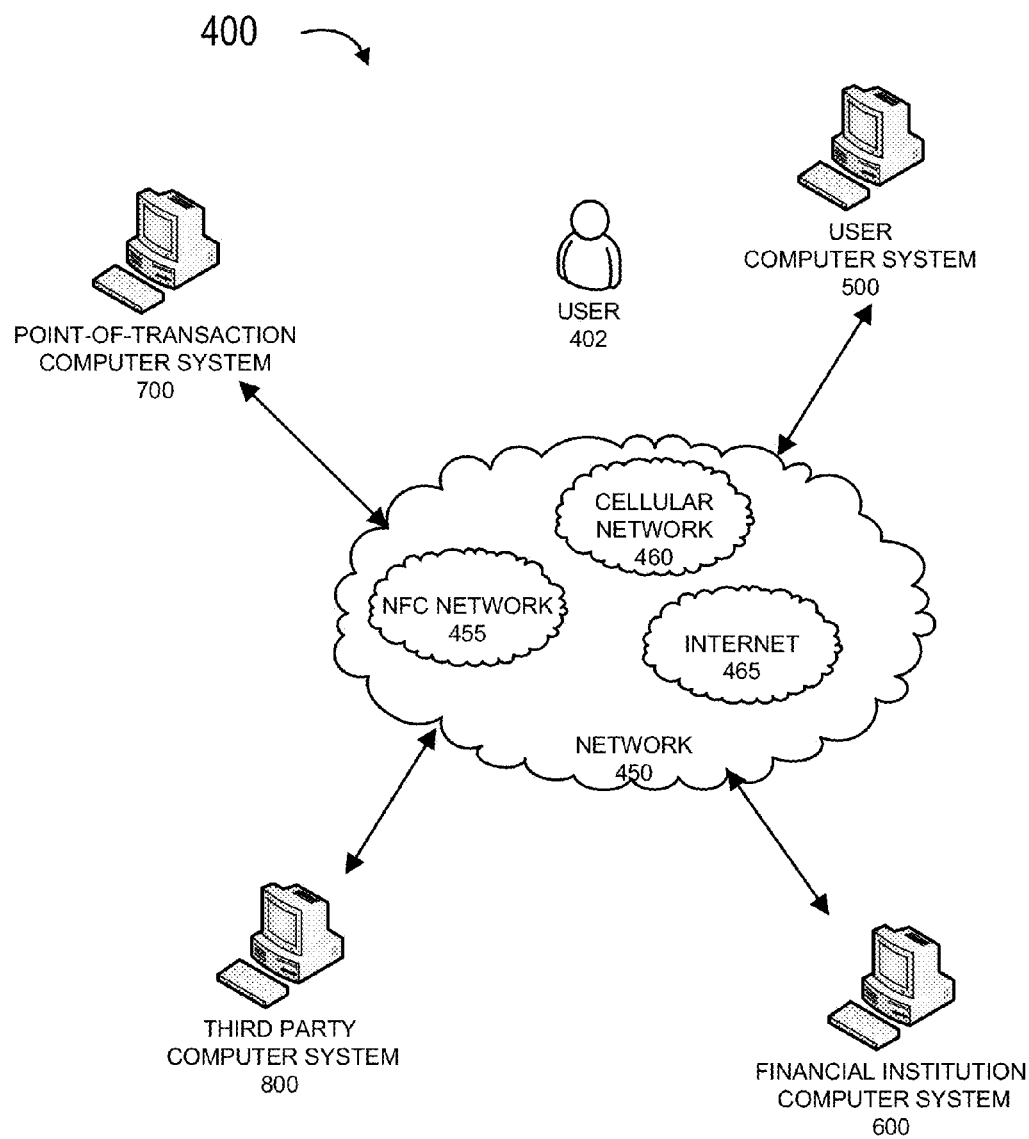
Figure 4:
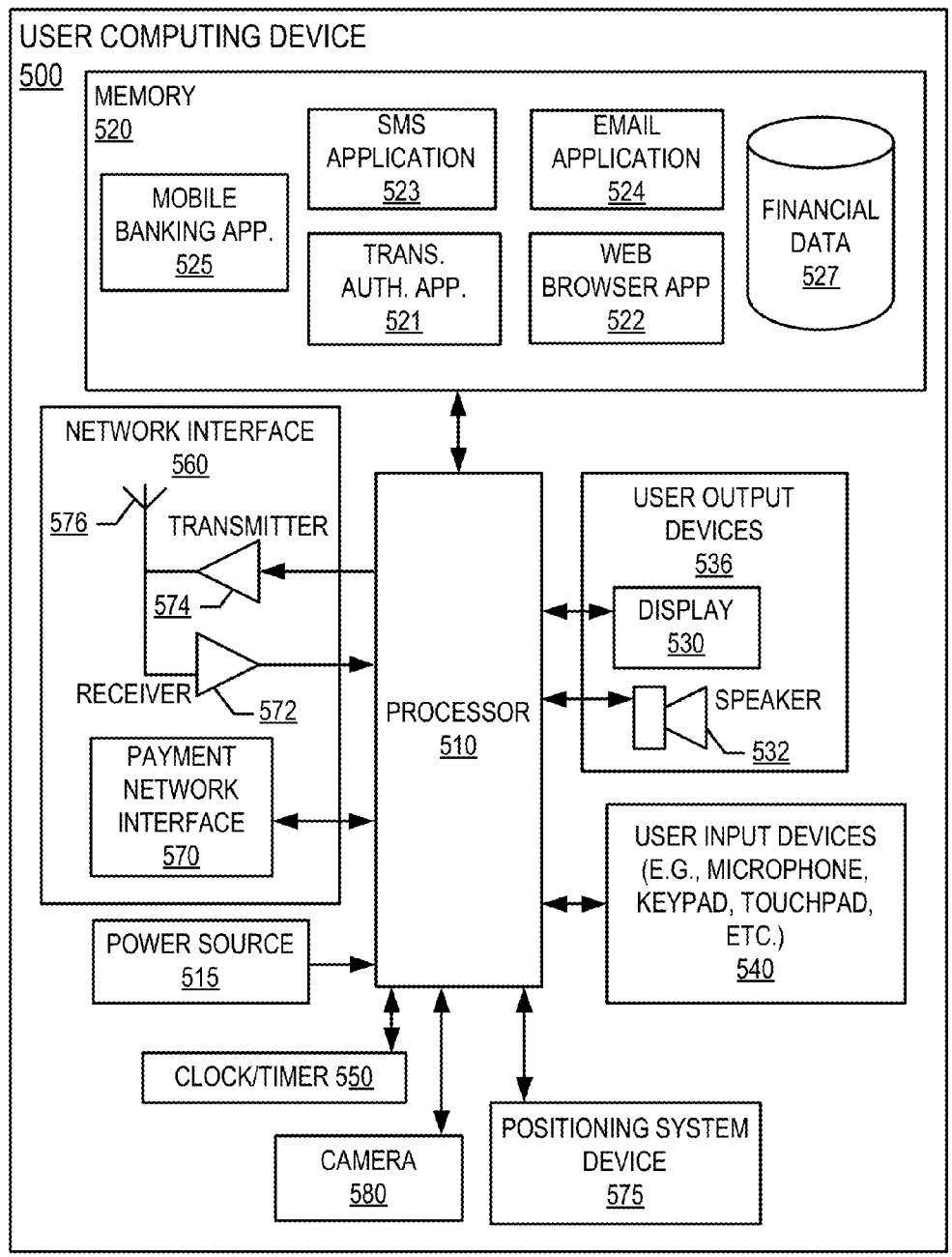
Figure 5:
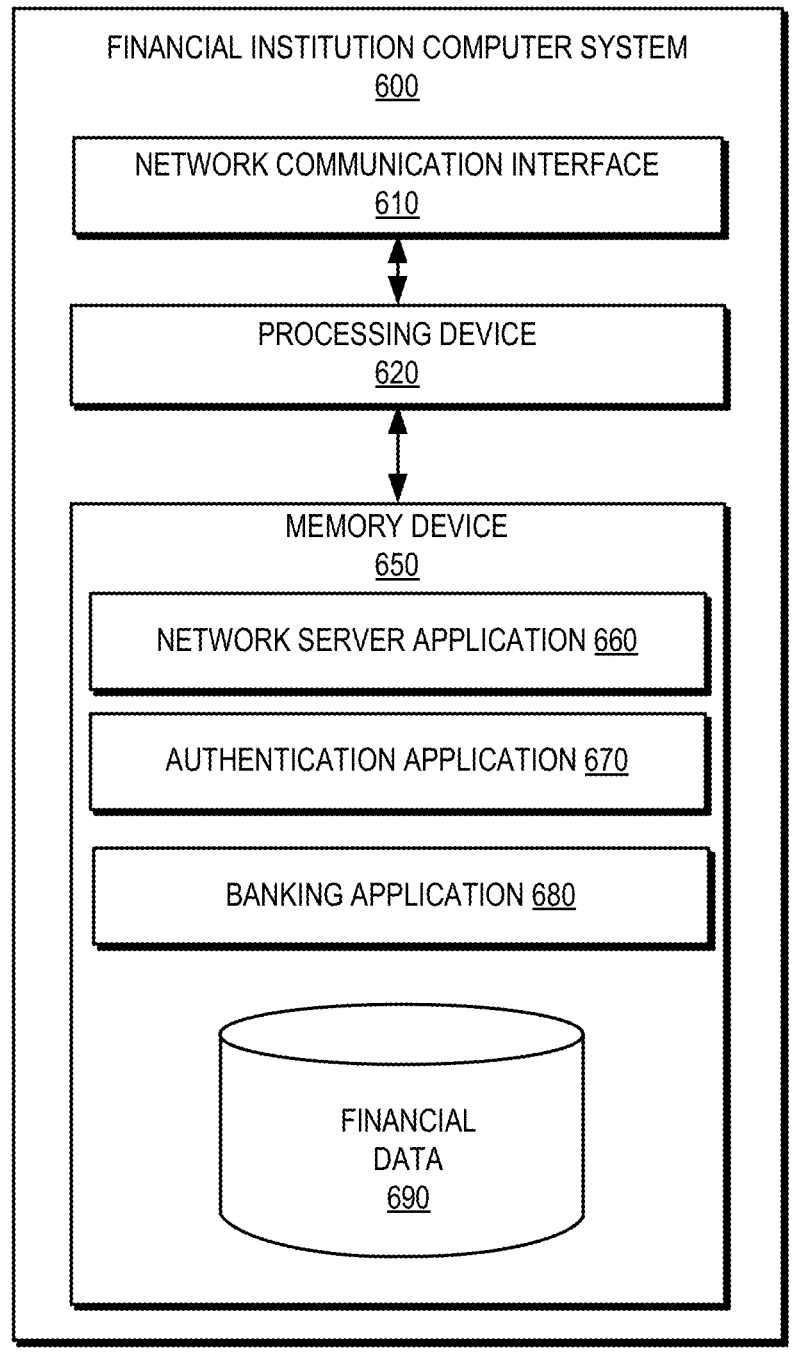
Figure 6:
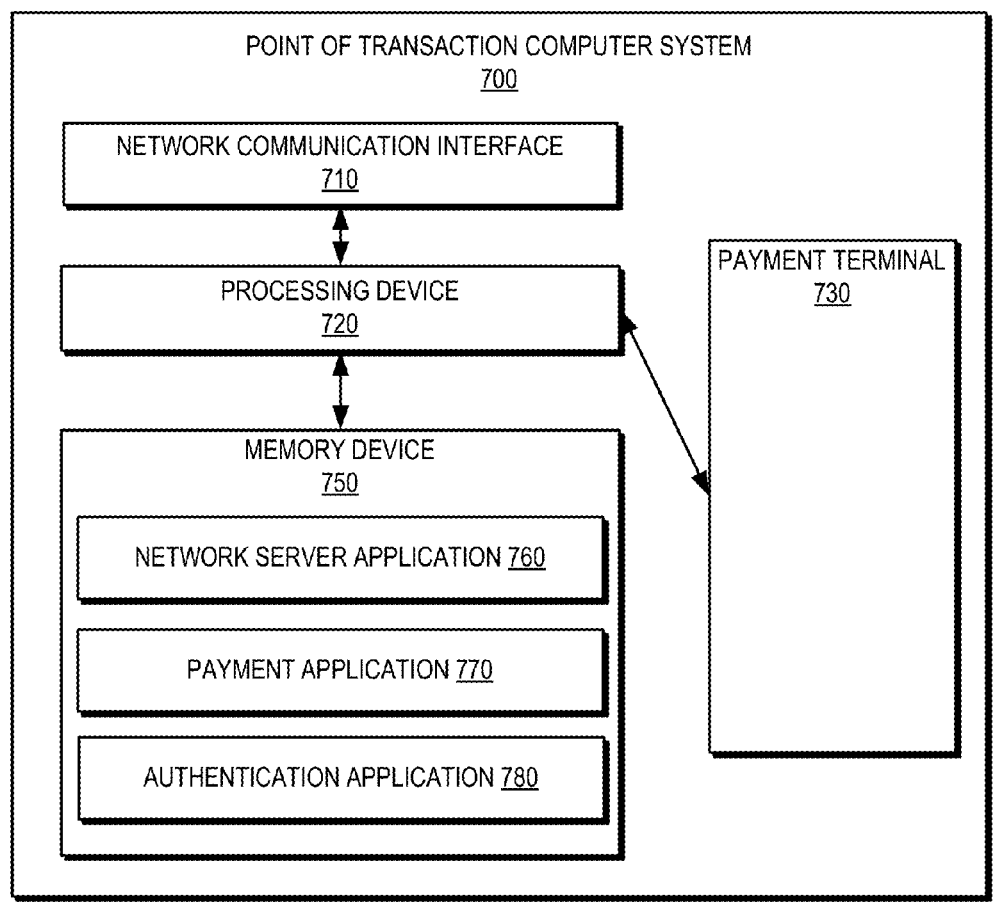
Figure 7:
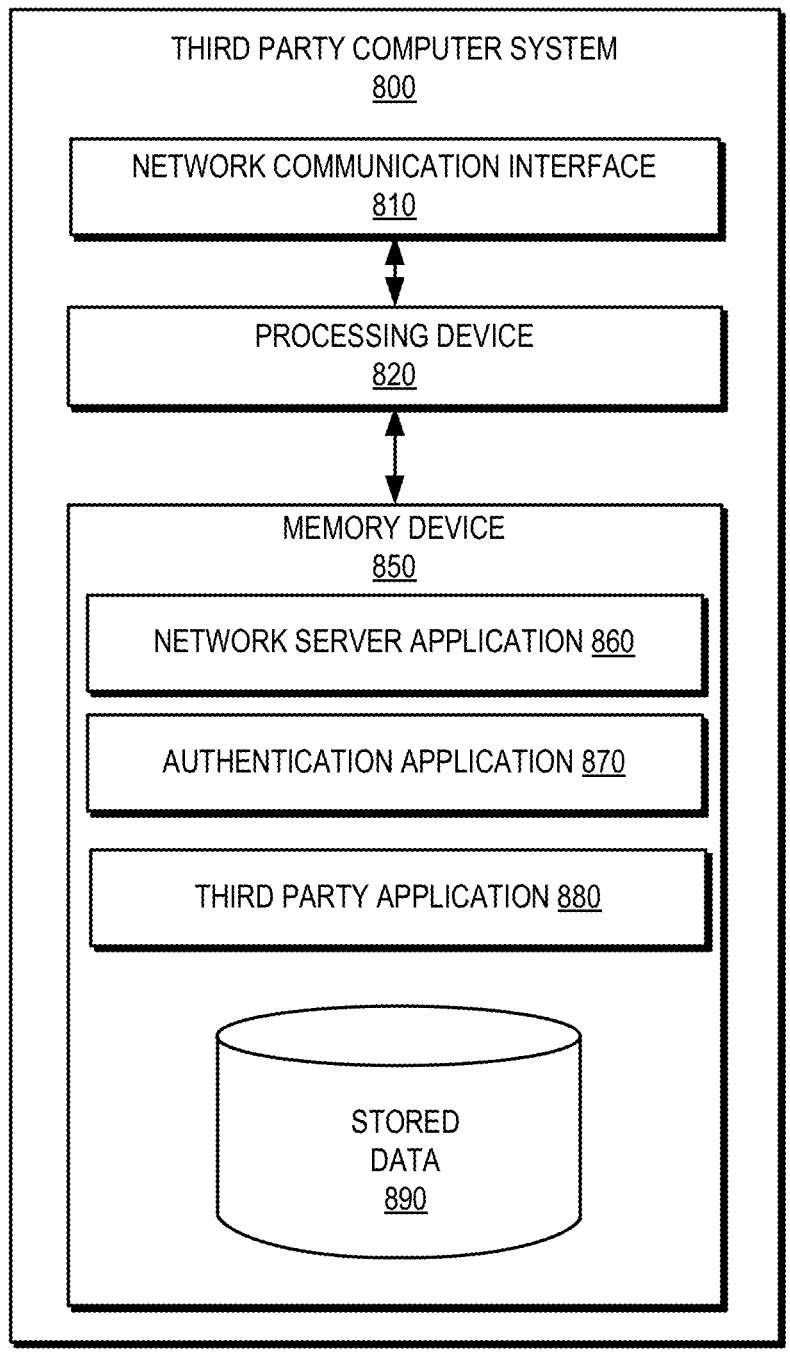

Having thus described embodiments of the invention in general terms, reference will now be made the accompanying drawings, wherein:

FIG. 1 is a flow diagram illustrating a general process flow for creating a system hardware signature for payment authentication, in accordance with an embodiment of the invention;

FIG. 2 is a flow diagram illustrating a general process flow for automatically detecting compromised hardware signatures, in accordance with an embodiment of the invention;

FIG. 3 provides a block diagram illustrating an system and environment configured to perform point of transaction authentication, in accordance with an embodiment of the invention;

FIG. 4 provides a block diagram illustrating the user's mobile computing device of FIG. 3, in accordance with an embodiment of the invention;

FIG. 5 provides a block diagram illustrating the financial institution's computer system of FIG. 3, in accordance with an embodiment of the invention;

FIG. 6 provides a block diagram illustrating the point of transaction computer system of FIG. 3, in accordance with an embodiment of the invention; and FIG. 7 provides a block diagram illustrating the third party computer system of FIG. 3, in accordance with an embodiment of the invention.

DETAILED DESCRIPTION OF EMBODIMENTS OF THE INVENTION

The following glossary of terms is intended to define the terms solely as they relate to this patent document, and should not be interpreted as definitions of the terms in any other context.

Account

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity.

Authentication Algorithm

An "authentication algorithm" is a procedure for use by a computing device processor in calculating, creating, and/or providing an encrypted and/or unencrypted hardware signature or unique signature to aid in an authentication process.

Authentication Information

"Authentication information" is any information that can be used to identify a user.

Bank Account

A "bank account" is a financial account between a bank customer and a financial institution. Examples of bank accounts include a deposit account, such as a transactional account (e.g., a banking account), a savings account, an investment account, a money market account, a time deposit, a demand deposit, a pre-paid account, a credit account, or the like.

Bank Card

A "bank card" is a card issued by a financial institution to a customer that enables the customer to perform one or more financial transactions. A bank card typically includes a magnetic strip and/or a chip that can be read by a card reader. By way of example, a bank card may be an ATM card, a debit card, a credit card, gift card, loyalty card, prepaid card and the like.

Checking Account

A "checking account" is a deposit account held at a bank or other financial institution for the purpose of securely and quickly providing access to funds on demand, through a variety of different channels.

Communication Interface

A "communication interface" or "communication device" is any device for communicating with other devices or with one or more users. For example, a communication interface may include a modem, server, transceiver, and/or a user interface.

Compromise

"Compromise" refers to the unauthorized access by an entity of sensitive, protected or confidential data, where the data is at least one of accessed, copied, transmitted, viewed, obtained or used by an unauthorized entity.

Computer Program Product

A "computer program product" is an article of manufacture that includes any non-transitory computer readable storage medium having data, code, or other information stored thereon. A computer program product typically includes computer-executable instructions (e.g., code) stored on non-volatile memory. When executed by a processor, such computer-executable instructions typically cause the processor to perform one or more functions.

Computing Device

A "computing device" is any device that employs a processor and memory and can perform computing functions, such as a personal computer or a mobile device.

Credit Card

A "credit card" is a payment instrument issued to users as a system of payment allowing a user of the credit card to pay for goods and services using a line of credit.

Database

A "database" or "data warehouse" is a computer based storage location composed of data extracted from data processing systems.

Debit Card

A "debit card" is a payment instrument that allows a user electronic access to account(s) at a financial institution.

Financial Institution

A "financial institution" is any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

Financial Transaction

A "financial transaction" refers to any transaction involving a transfer of money or something of monetary value. For example, a financial transaction may refer to a purchase of goods or services, a return of goods or services, a payment transaction, a credit transaction, a rewards transfer, or an account money transfer or withdrawal.

Initiate Display

The phrase "initiate display" refers to the computing device system causing a process and/or action to commence the presentation of one or more items onto a display associated with the computing device system.

Key

A "key" is any type of parameter (e.g. image, pattern, alphanumeric code, encryption tool, and the like) that can be utilized to determine whether or not malware is present on a system.

Malware

"Malware" is any software used to disrupt the operation of a computing device, gather sensitive information, or gain access to computing device systems by damaging, corrupting, and/or taking partial control of its operation.

Memory

A "memory" or "memory device" is any computer readable medium configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

Misappropriation of Identity

A "misappropriation of identity" or "misuse of identity" is the deliberate deception of a user's identity practiced in order to secure unfair or unlawful gain.

Mobile Device

A "mobile device" is any mobile communication device, such as a cellular telecommunications device (i.e., a cell phone or mobile phone), personal digital assistant (PDA), a mobile Internet accessing device, a tablet computer, a laptop, jewelry, or other mobile device.

NFC Interface

An "NFC interface" may refer to near field communication hardware and/or software that is configured to contactlessly and/or wirelessly send and/or receive information over relatively short ranges via radio transmissions (e.g., within four inches, within three feet, within fifteen feet, and the like). The NFC interface may include a smart card, key card, proximity card, Bluetooth® device, radio frequency identification (RFID) tag and/or reader, transmitter, receiver, and/or the like.

Online Banking

"Online banking" may refer to performing banking activities via an interconnected network system such as the Internet.

Payment

A "payment" is a monetary amount or item of monetary value transferred from one individual or entity to another individual or entity in return for receipt of good(s) and/or services.

Payment Authentication

"Payment Authentication" refers to a method or means for authenticating a person or entity (or holder of another payment device/instrument) or the payment device/instrument itself being used to process a transaction payment at the time of the transaction.

Payment Information

"Payment Information" refers to any details required for the processing the purchase of goods and/or services or providing payment authentication related to the purchase of goods and/or services. Payment information may include, but not be limited to, credit and/or debit card numbers, bank account numbers, customer information (e.g. address, telephone number, and the like) and merchant codes.

Payment Instrument

A "payment instrument" refers any evidence of rights to the payment of monetary funds. Payment instruments include checks, drafts, securities (such as stocks and bonds), debit cards, credit cards, and any other written or electronic evidence of rights to the payment of monetary funds.

Point-of-Transaction

A "point-of-transaction" refers to a location associated with a transaction. A point-of-transaction (e.g., a point of sale (POS)) could refer to any location, virtual location or otherwise proximate occurrence of a transaction. Typically, the point-of-transaction is the location of a point-of-transaction device.

Point-of-Transaction Device

A "point-of-transaction device" refers to any device, hardware, and/or software used to perform a transaction.

Processor

A "processor" or "processing device" refers to a device or combination of devices having circuitry used for implementing the communication and/or logic functions of a particular system.

Remediation Actions

"Remediation actions" refer to any operations implemented by a computing device system for the purpose of reversing, halting, and/or impeding damage or alteration of the computing device system.

System Hardware Profile

A "system hardware profile" or "hardware profile" refers to any system specifications (e.g. general identification numbers, hard drive internal serial number, hardware identification of a sound card, media access control (MAC) address, and the like) associated with a specific computing device system for which information is accessible for the purpose of creating a unique signature.

Transaction

A "transaction" refers to any communication or interaction between two parties for the exchange of information, payment, products, services and the like.

Unique Hardware Signature

A "unique hardware signature" refers to any type of identification parameter that specifically identifies a particular hardware device.

User Interface

A "user interface" is any device or software that allows a user to input information, such as commands or data, into a device, or that allows the device to output information to the user.

Method for Payment Authentication Using a System Hardware Signature

Referring now to FIG. 1, a general process flow 100 is provided for creating a system hardware signature for payment authentication. In some embodiments, the process flow 100 is performed by a system (i.e., one or more apparatuses) having hardware and/or software configured to perform one or more portions of the process flow 100. In such embodiments, as represented by block 110, the system is configured to create a unique signature based at least in part on a hardware profile of the system. As represented by block 120, the system is also configured to receive a request, from a user, to perform a transaction using the system. As represented by block 130, the system is also configured to create a key based on the unique signature in response to receiving the request. As represented by block 140, the system is also configured to initiate display of the key to the user. As represented by block 150, the system is also configured to receive user input entered in response to the user viewing the key. Lastly, as represented by block 160, the system is configured to determine whether to proceed with transaction payment authentication based at least on whether the received user input matches the created key. A hardware profile of the system or system hardware profile may include information that may be collected from a variety of sources. In some instances, the hardware profile includes an identification code. The identification code may be but is not limited to a serial number or an item number of a system or device. The hardware profile may be associated with a chip associated with a system or device. The chip may be but is not limited to a subscriber identification module (SIM) card, removable hard drive, processor, microprocessor, or the like. The hardware profile may be associated with a removable part of the system or device. Removable parts include but are not limited to detachable keyboards, battery covers, cases, hardware accessories, or the like. Removable parts may contain serial numbers or part numbers. Alternatively, a unique key, code, or piece of software provided by a financial institution may be downloaded onto the device. This unique key, code, or piece of software may then serve as some or all of a hardware profile.

It will be understood that the system having the process flow 100 can include one or more separate and/or different apparatuses. For example, in some embodiments of the invention, a single apparatus (e.g., computing device 500 described in connection with FIG. 4) is configured to perform all of the portions of process flow 100 represented by blocks 110 to 160. However, in some other embodiments, a first apparatus (e.g., mobile computing device 500 described in connection with FIG. 4) is configured to perform the portions of process flow 100 represented by blocks 110, and 130 to 150 and a second apparatus (e.g., financial institution computer system 600 or point-of-transaction computer system 700 described in connection with FIG. 4) is configured to perform the portions of process flow 100 represented by block and 120 and 160.

Regarding block 110, the phrase "unique signature" refers to any type of identification parameter (e.g. pattern, personal identification number (PIN), alphanumeric code, and the like) that is exclusively associated with one specific computing device system. In some embodiments, the unique signature may be used to either partially and/or fully provide identification for the associated computing device system. In some embodiments, creating the unique signature comprises retrieving and/or obtaining information from multiple parts of a computing device system (e.g. general identification numbers, hard drive internal serial number, hardware identification of a sound card, media access control address (MAC), and the like) and combining it in such a way as to identify the system. In some embodiments, the system comprises a software module having a unique signature software module therein configured to create the unique signature. In such an embodiment, the unique signature software module is stored in the memory prior to creation of the unique signature and is protected, and thereby not writable, subsequent to being stored. The unique signature may be created and/or based in part on several parameters including, but not limited to, the current date and/or time.

Further concerning block 110, the phrase "hardware profile" refers to any system specifications (e.g. general identification numbers, hard drive internal serial number, hardware identification of a sound card, media access control (MAC) address, and the like) associated with a specific computing device system for which information is accessible for the purpose of creating a unique signature. In this way, the hardware profile may additionally include software specifications (e.g. program execution patterns, algorithms, and the like) or profiles associated with the computing device system.

In one embodiment, the hardware profile refers to one or more software and/or program execution patterns of the computing device system. In such an embodiment, the software and/or programs are implemented using the computing device system. As discussed in further detail throughout the specification unique signatures based on hardware profiles such as program execution patterns may then be used to detect the presence of one or more malware programs that are present within the computing device system and attempting to process actions that are similar to authorized software implemented on the system. In one embodiment, detecting the presence of malware within the computing device system may comprise comparing one or more programs unique signatures to the execution pattern of known malware programs. In an instance that the unique signature is determined to be equivalent to the execution pattern of known malware programs the program associated with the unique signature may be subsequently determined to be a malware program. In an alternate embodiment, detecting the presence of malware within the computing device system may comprise monitoring the execution patterns of known authorized software programs and building one or more normal execution pattern profiles to be used in comparison with any unauthorized software programs, as such, software programs with execution patterns that deviate from what is considered to be a normal execution pattern based on the monitoring of authorized software programs and applications may then be determined to be malware or require an additional level of authentication prior to being authorized to execute any additional actions. For example, a user may be required to authorize any software programs and/or applications for which the system has determined to have execution patterns that are different from what is considered to be a normal execution pattern.

In another embodiment, the hardware profile refers to one or more hardware and/or general system specifications of the computing device system. For example, the system may create the unique signature by initially executing various functions including, but not limited to, retrieving and/or obtaining information from the registry associated with the computing device system, retrieving the media access control (MAC) address from the local area network (LAN) card, retrieving the video card manufacturer, obtaining identification from the central processing unit, and the like. In some embodiments, creating the unique signature may further comprise utilizing the retrieved information in conjunction with an algorithm (e.g. a hash function) to manipulate the received information and create a unique signature therefrom. For example, the algorithm may obtain and/or receive one or more system specification parameters from within the received information and either partially or fully combine at least a portion of the information in a unique way and output the combine results as a unique signature which identifies the computing device system.

In one embodiment, the hardware profile refers to a set of computing device instructions that advises the computing system of which devices within the computing device system and/or programs implemented by the computing device system to execute when starting and/or powering the computing device system. The hardware profile may additionally refer to one or more settings to be used by devices within the computing device system and/or programs implemented by the computing device system to execute when starting and/or powering the computing device system. As such, a system may have one or more hardware profiles associated with it and/or associated with different users of the system. For example, in some embodiments, the computing device system may be embodied by a mobile or portable computing device such as a laptop. The laptop may then have a first hardware profile used when the computing device is powered from a docking station with additional hardware components such as a CD-ROM drive and a network adapter, and a second hardware profile used when the computing device is powered in an undocked environment without any additional hardware components such as a CD-ROM and a network adapter, but instead utilizes a modem. As docking stations are traditionally associated with the known secure locations such as an office or home, and undocked environments are traditionally associated with unknown locations such as a coffee shop or hotel, unique signatures based on the second hardware profile, as opposed to the first hardware profile, may have an added level of security. In some embodiments, only one unique signature is created although more than one hardware profile exists. In such an embodiment, the computing device system may be further configured to allow a user to designate which hardware profile should be used for the creation of the unique signature.

In some embodiments, the unique signature is hardware specific. In such an embodiment, the hardware may be embodied by an internal write and/or an external read-only system such that the specifications of the system will prevent downloads from infecting the system. In one embodiment, data written to the core system files may only be accessible from specific inputs. For example, the hardware may be embodied by a card (e.g. memory card, expansion card, serial board, and the like) having data written to the card such that when the card is inserted it can be used to authenticate, authorize and initiate the generation of the unique signature.

Regarding block 120, the phrase "transaction using the system" means any type of financial or non-financial transaction being either initiated, processed, and/or authenticated using the system. In some embodiments, the transaction is one in which the user is purchasing certain goods or services from another party, such as a vendor or merchant. In other embodiments, the user may be receiving money or other funds from a third party or transferring money or other funds to a third party. As one of skill in the art will appreciate, the phrase "transaction using the system" can be any type of financial transaction in which goods, services, money, and/or other items of value are exchanged between two or more individuals or entities (e.g., purchase of goods or services, a return of goods or services, a payment transaction, a credit transaction, or other interaction involving a user's bank account, credit account, a debit/deposit account or the like, etc.). For example, a transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In some embodiments, the transaction may require the user to approach a point of transaction device, such as a point of transaction computer system and/or payment terminal. In some embodiments, the point of transaction computer system may comprise a cash register and/or payment terminal. In other embodiments, the payment terminal may be a separate point of transaction device. In some embodiments, the payment terminal provides the user with functionality to conduct a transaction, such as functionality to swipe a credit card, functionality to swipe a debit card, functionality to input a PIN number or other data used to authenticate a transaction, and/or functionality to use the e-wallet capability of a mobile computing device. In other embodiments of the invention, a payment terminal comprises only a device capable of communicating with a mobile device. In these embodiments, the payment terminal does not include any functionality for swiping a card (e.g., debit card, credit card, etc.) or inputting any PIN numbers or any other data used to authenticate a transaction.

In some embodiments, the payment terminal may comprise a near field communication payment terminal. In these embodiments, where the user's mobile computing device (also referred to herein as a "mobile device") is equipped with e-wallet functionality, a user may tap or physically touch the user's mobile computing device against the near field communication terminal to initiate the transaction. In some embodiments, a user may tap the user's mobile computing device against the near field communication terminal in order to pay for goods and/or services. In other embodiments, a user may tap the user's mobile computing device against the near field communication terminal in order to send or received money or other funds. In other embodiments, the user may not tap or physically touch the user's mobile computing device against the payment terminal in order to interact with the payment terminal. In yet some other embodiments, the payment terminal may use any other type of communication protocol other than near field communication technology to enable a user to use the e-wallet functionality of the user's mobile computing device.

In some embodiments of block 120 the transaction may involve the user's mobile computing device communicating with the point of transaction device over a network. In some embodiments, the user's mobile computing device and the point of transaction device communicate over a wireless network, such as a cellular communication network, near field communications network, Bluetooth network, and/or another wireless network. In some other embodiments, the transaction may involve the user's mobile computing device and the point of transaction device communicating over a wireline network.

Further concerning block 120, the phrase "request to perform a transaction using the system" means any quantity and/or type of information associated with a transaction involving a user that informs the system of the users attempt to process a transaction. In some embodiments, the information associated with a transaction involving a user may be a request to authenticate the transaction. In some embodiments, the request is sent from a point of transaction device. In some other embodiments, the request is inputted by the user of the system configured to perform process flow 100. In other embodiments, the request to perform a transaction using the system may be a notification that the user has commenced the transaction, which in some embodiments, may be sent from a point of transaction device. In other embodiments, the request to perform a transaction using the system may be a notification that the user and/or the system is physically located near a point of transaction device. In some other embodiments of the invention, the request to perform a transaction using the system may be information that identifies the user, such as the user's name, bank account number, debit card number, credit card number, or telephone number, etc.

Lastly, at block 120, the system configured to perform the process flow 100 may "receive" the information associated with a transaction involving a user according to any method known to one skilled in the art. In some embodiments, the system receives the information over a wireless network, such as a cellular communications network, near field communications network, Bluetooth network and/or another wireless network. In some other embodiments, the system may receive the information over a wireline network. In some embodiments of the invention, the system configured to receive information associated with a transaction involving a user may be a mobile computing device, such as mobile computing device 500 of FIG. 4. In such embodiments, mobile computing device 500 may receive the information associated with a transaction involving a user from a point of transaction device, such a point of transaction computer system 700 from FIG. 4 and/or payment terminal. In other embodiments, mobile computing device 500 may receive information associated with a transaction involving a user from another device that can communicate with mobile computing device 500 over a network, such as financial institution computer system 600 from FIG. 4. In yet some other embodiments, the mobile computing device may receive information associated with a transaction involving a user via a user's interaction with the mobile computing device (e.g., opening a mobile application, etc.).

In some embodiments, particularly where a mobile computing device is configured to perform process flow 100, the mobile computing device may receive information associated with a transaction involving a user before the user commences the transaction. For example, in some embodiments, the user may open an authentication application on the mobile computing device that allows the user to authenticate the transaction while still waiting in line to access a point of transaction device. In some other embodiments, the mobile computing device may receive an indication from a point of transaction device (via a NFC, Bluetooth or other wireless communication protocol) that the mobile computing device is within the proximity of a point of transaction device. The mobile computing device may receive this indication while the user is waiting in line to access the point of transaction device. However, in some other embodiments, the mobile computing device may receive information associated with a transaction involving a user before the user commences the transaction. For example, the mobile computing device may receive information associated with a transaction involving a user after the user has bumped, tapped or otherwise physically touched the mobile computing device to a NFC payment terminal (or other payment terminals with similar e-wallet functionality).

Regarding block 130, the phrase "key" refers to any type of parameter (e.g. image, pattern, alphanumeric code, and the like) that can be utilized to determine whether or not malware is present on a system. For example, the key may be embodied by a completely automated public Turing test to tell computers and humans apart (CAPTCHA) or a human interaction proof (HIP) test. In some embodiments, creating the key based on the unique signature comprises retrieving and/or obtaining information from the unique signature and using at least a portion of the information for use in creating the key. Additionally, a new key may be created from the unique signature each time the user request to perform a transaction using the system.

In one embodiment, the system receives the unique signature based on the hardware profile and generates a random string based on the unique signature. The random string may then be used as the key embodied by an alphanumeric string. For example, the unique signature may be an alphanumeric string such as "12345ABCDE" and the system may generate a random string comprising the numbers and letters of the alphanumeric string such as "15BE". In another embodiment, the random string may be written to an image and prepared for display to a user, where one or more characters within the random string may be distorted within in the image such that the distorted characters are not recognizable by malware programs, and can only be read through human interaction from the user. The key may be embodied by either an audio or visual representation such that in an alternative embodiment, the random string may be written to an audible format and prepared for presentation to the user. Creating the key may further comprise the system being configured to store the key for later presentation and/or display to the user.

Regarding block 140, the phrase "initiate display" refers to the computing device system causing a process and/or action to commence the presentation of one or more items onto a display associated with the computing device system. In some embodiments, the key is an image or alphanumeric code; as such initiating display of the key may comprise presenting the image on a visual display associated with the computing device system. In another embodiment, the key is an audio file; as such initiating display of the key may comprise presenting the user with a series of spoken letter or numbers via an audio device associated with the computing device system (e.g. speaker, headphones, and the like). The user may additionally define a format in which the key is to be display and/or presented by the computing device. For example, a user with a hearing impairment may specify through predefined user preferences that the key should only be presented in an audible format.

In some embodiments, the system display is a touch screen display that allows the user to not only view the key but directly interact with the key to execute additional actions such as providing user input related to the display of the key. In an instance that the display is not a touch screen display, the user may interact with the key using a plurality of other devices or features integrated within the computing (e.g. keyboard, microphone, voice recognition software, and the like). For example, in one embodiment the key may be partially audio and partially visual. The system may visual present the user an image or alphanumeric code, the system may then orate a series of characters from within the visual image or alphanumeric code, and the user may be required to select to orated characters from the presented image or alphanumeric code using the touch screen display. In some embodiments, the display is not large enough to present a fully detailed representation of the key, as such when the key is initially presented several of the characters within the key may be truncated on the display screen. In such an embodiment the user may then request to view additional details of any truncated line item within the presented key. Alternatively, in some embodiments, versus simultaneously presenting multiple characters of the key on the display screen, the system may instead present individual characters one at a time, and allow the user to tab through the characters using a "next" selection or button feature.

With regards to block 140, in addition to initiating the display of the key to the user the system may "prompt" the user to provide user input, verifying the presence of human interaction, in response to the user viewing the key using any known methods. In some embodiments, where the system configured to perform process flow 100 is a mobile computing device, the mobile computing device may display a dialog box or other graphical indicator to prompt the user to provide user input verifying the presence of human interaction. In other embodiments, the mobile computing device may emit a sound and/or vibrate so as to alert a user to provide user input verifying the presence of human interaction. In other embodiments, the system configured to perform process flow 100 may prompt the user to provide user input verifying the presence of human interaction by calling a telephone associated with the user, sending an email to an account associated with the user, or sending a text message to a mobile computing device associated with the user, and the like.

In some embodiments of the invention, the system may prompt the user to provide user input verifying the presence of human interaction before the user has requested to perform a the transaction using the system (i.e., while the user is waiting in line to access a point of transaction device, etc.) and in other embodiments of the invention, the system may prompt the user to provide user input verifying the presence of human interaction after the user has requested to perform the transaction using the system (i.e., after the user has tapped, bumped or otherwise physically touched a mobile device to a NFC payment terminal, etc.)

Regarding block 150, the system configured to perform the process flow 100 may "receive" the user input entered in response to the user viewing the key according to any method known to one skilled in the art. In some embodiments, receiving user input entered in response to the user viewing the key may comprise the system first presenting to the user a textbox for receiving the user input entered in response to the user viewing the key or recording an audio input from the user provided in response to the user hearing the key. Further, in connection with block 150, the system configured to perform process flow 100 may receive the user input through any method and/or functionality known to one of skill in the art. For example, the system may receive the received user input by allowing a user to interact with the system and input the authentication data through the use of a keyboard, keypad, touch screen, mouse and/or similar functionality. Additionally, the system may receive the received user input through the use of a microphone, where the user's voice or the words spoken by the user comprises the authentication data.

In some embodiments, the system receives the user input entered in response to the user viewing the key over a wireless network, such as a cellular communications network, near field communications network, Bluetooth network and/or another wireless network. In some other embodiments, the system may receive the user input entered in response to the user viewing the key over a wireline network. In some embodiments of the invention, the system configured to receive the user input entered in response to the user viewing the key may be a mobile computing device, such as mobile computing device 500 of FIG. 3. In such embodiments, mobile computing device 500 may receive the user input entered in response to the user viewing the key from a point of transaction device, such a point of transaction computer system 700 from FIG. 3 and/or payment terminal. In other embodiments, mobile computing device 500 may receive the user input entered in response to the user viewing the key from another device that can communicate with mobile computing device 500 over a network, such as financial institution computer system 600 from FIG. 3. In yet some other embodiments, the mobile computing device may receive the user input entered in response to the user viewing the key via a user's interaction with the mobile computing device (e.g., opening a mobile application, etc.).

At block 160, the term "received user input" refers to any data or information that the user provides to the system configured to perform process flow 100 to verify human interaction, as discussed in relation to blocks 140 and 150. In some embodiments, the received user input may comprise a PIN number based on the key. In other embodiments, the received user input may comprise the answer to a challenge question based on the key. In still some other embodiments, the received user input may comprise information associated with a gesture or other movement of a user's body, where the gesture or movement is used to verify human interaction based on the key. For example, in some embodiments, the mobile computing device associated with the user may analyze a gesture to determine whether it matches a pre-determined gesture key used to verify human interaction.

Lastly, with regards to block 160, the phrase "based at least in part" means any quantity and/or type of information associated with the received user input. In some embodiments of the invention, the determination whether to proceed with transaction payment authentication may be based on the received user input itself. In other embodiments of the invention, the determination whether to proceed with the transaction payment authentication may be based on whether the received user input is entered correctly with respect to whether or not the received user input matches the created key. In some embodiments, determining comprises determining that the received user input does not match the created key, and in response, determining not to proceed with transaction payment authentication.

As discussed below, in some embodiments of block 160, the system may communicate the received user input to other device within the computing system for subsequent verification. The computing device system may subsequently determine whether or not the received user input matches the created key. The computing device system may use any method to determine whether or not the received user input matches the created key. In some embodiments, the computing device system may send (via wireless or wireless communication channels) the received user input to a third party computer system in order to verify that the whether or not the received user input matches the created key. In such an embodiment, the created key may be remotely stored on the third party system versus being locally stored within the computing device system. Upon receiving the user input, the third party computer system may compare the received user input to the stored key. The stored key may comprise information that is necessary to verify human interaction with the system involving the user. If the received user input matches the stored key (which may be stored in a memory device that is accessible to the third party computer system), then the received user input is correct and system determines to process with the transaction payment authentication. In some embodiments, the third party computer system may subsequently send an indication to the computing device system that the received user input matches the created key and the system may proceed with transaction payment authentication.

Additionally, as discussed above, in some other embodiments of block 160, where the determination whether or not to proceed with the transaction payment authentication may be based on whether the received user input is entered correctly with respect to whether or not the received user input matches the created key, the system configured to perform process flow 100 may further be configured to determine, or verify whether the received user input is correct or not. The system may use any method to determine whether the authentication data is correct or not, including the previously discussed method of sending the received user input to a third party computer system for comparison with stored information such as the created key. Additionally, the system itself may store the created key, and the system itself could compare the received user input to the stored key to determine if the received user input matches the created key. In some embodiments, the system may determine that malware is present based at least on determining that the received user input does not match the created key.

Furthermore, where the system configured to perform process flow 100 is a mobile computing device, the mobile computing device may be configured to display indicia or a bar code on the mobile computer device display if the user provides the correct received user input. Thus, in some alternative embodiments not described in relation to FIG. 1, the user could show or otherwise provide the indicia or bar code to the point of transaction device in order to proceed with transaction payment authentication. As one of skill in the art will appreciate, the mobile computing device could be configured to display an indicia or bar code that when scanned, or "read" by the point of transaction device, provides a notification to the point of transaction device that the transaction payment is authenticated.

Method for Automatic Compromise Detection for Hardware Signature Authentication Algorithm Referring now to FIG. 3, a general process flow 200 is provided for automatically detecting that a hardware signature or hardware signature authentication algorithm has been compromised. In some embodiments, the process flow 200 is performed by a system (i.e., one or more apparatuses) having hardware and/or software configured to perform one or more portions of the process flow 200. In such embodiments, as represented by block 210, the system is configured to create a unique signature based at least in part on a hardware profile of the system as previously discussed herein. As represented by block 220, the system is also configured to receive a request, from a user, to perform a transaction using the system as previously discussed herein. Lastly, as represented by block 230, the system is also configured to determine whether or not malware has compromised the signature creation algorithm and if so, prevent the signature creation algorithm from creating a key based on the unique signature, and if not, allowing the signature creation algorithm to create a key based on the unique signature.

It will be understood that the system having the process flow 200 can include one or more separate and/or different apparatuses. For example, in some embodiments of the invention, a single apparatus (e.g., computing device 500 described in connection with FIG. 4) is configured to perform all of the portions of process flow 200 represented by blocks 210 to 230. However, in some other embodiments, a first apparatus (e.g., computing device 500 described in connection with FIG. 4) is configured to perform the portions of process flow 200 represented by blocks 210 to 220 and a second apparatus (e.g., third party computer system 800 described in connection with FIG. 4) is configured to perform the portions of process flow 200 represented by block 230. Regarding block 210, creating a unique signature, using a signature creation algorithm, based at least in part on a hardware profile of the system may be executed according to various methods previously discussed herein with reference to block 110. Regarding block 220, receiving a request, from a user, to perform a transaction using the system may be executed according to various methods previously discussed herein with reference to block 120.

Regarding block 230, in some embodiments determining whether malware has compromised the signature creation algorithm signature further comprises initially storing the signature creation algorithm in the memory of the computing device prior to the creation of the unique signature. In such an embodiment, the signature creation algorithm may be protected by the system such that after being stored the signature creation algorithm is not writable and thus not prone to tampering by a malware program. Storing and protecting the signature creation algorithm may comprise the system being configured to encrypt the signature creation algorithm prior to storing the algorithm in the memory of the computing device. In such an embodiment, the encrypted signature creation algorithm may be only accessible by the system for the purpose of creating the unique signature where accessing the algorithm may further comprise providing any authorized signature creation programs and/or software with a decryption key for accessing the signature creation algorithm.

Further concerning block 230, in some embodiments determining whether malware has compromised the signature creation algorithm comprises monitoring whether or not any application(s) or system(s) has accessed the hardware profile of the system. The system may then further determine whether or not the application, program, or system that accessed the hardware profile was authorized to be provided with access to the hardware profile. In some embodiments, if it is determined that an authorized application or system accessed the hardware profile then it may be subsequently determined that the signature creation algorithm has not been compromised by malware. Similarly, if it is determined that no application(s) or system(s) have accessed the hardware profile of the system then it may be subsequently determined that the signature creation algorithm has not been compromised by malware. Alternatively, if it is determined that an unauthorized application or system accessed the hardware profile then it may be subsequently determined that the signature creation algorithm has been compromised by malware.

Further concerning block 230, in some embodiments determining whether malware has compromised the signature creation algorithm comprises monitoring whether or not any application(s) or system(s) has accessed predetermined data stored in the memory of the system (or remotely stored in the memory of an associated system). The predetermined data may include in data received and/or created by the system such as hardware/software specification, the hardware profile, the unique signature, application(s), algorithms, and the like. The system may then further determine whether or not the application, program, or system that accessed the predetermined data was authorized to be provided with access to the predetermined data stored in the memory of the system. In some embodiments, if it is determined that an authorized application or system accessed the predetermined data stored in the memory of the system then it may be subsequently determined that the signature creation algorithm has not been compromised by malware. Similarly, if it is determined that no application(s) or system(s) have accessed the predetermined data stored in the memory of the system then it may be subsequently determined that the signature creation algorithm has not been compromised by malware. Alternatively, if it is determined that an unauthorized application or system accessed the predetermined data stored in the memory of the system then it may be subsequently determined that the signature creation algorithm has been compromised by malware. In such an embodiment, the system may be further configured to initiate one or more remediation actions configured to mitigate an impact of the malware or eliminate the malware including but not limited to, removing and/or quarantining the malware program. In some embodiments, the system may be configured to further initiate a malware presence communication, to the user and/or a second system, comprising an indication of the presence of malware on the system.

In some embodiments, as previously discussed herein if it is determined that an unauthorized application or system accessed the predetermined data stored in the memory of the system then it may be subsequently determined that the signature creation algorithm has been compromised by malware and an additional level of authentication may be required prior to being authorized to execute any additional actions. For example, a user may be required to authorize any software programs and/or applications for which the system has determined are unauthorized to access the predetermined data stored in the memory of the system. After receiving such an authorization from the user the unauthorized application(s) or system(s) may be added to a list of authorized application(s) or system(s) for accessing predetermined data stored in the memory of the system such that the user is not subsequently required to reauthorize the application(s) or system(s) in an instance that they attempt to access the predetermined data a second time.

Lastly concerning block 230, if it is determined that malware has compromised the signature creation algorithm the system may be further configured to prevent the signature creation algorithm from creating a key based on the unique signature by termination and processes or actions previously discussed herein for the purpose of creating a key based on the unique signature. Alternatively, if it is determined that malware has not compromised the signature creation algorithm the system may be further configured to initiate and allow the signature creation algorithm to create the key based on the unique signature according to various method previously discussed herein with reference to block 130.

Transaction Authentication System and Environment

FIG. 3 provides a block diagram illustrating a system and environment 400 in accordance with an embodiment of the invention. As illustrated in FIG. 3, the system environment 400 includes a user 402. The environment 400 also includes a user computing device 500 belonging to user 402. As used herein, a "user computing device" is any computing device, such as a cellular telecommunications device (i.e., a cell phone or mobile phone), personal digital assistant (PDA), a mobile Internet accessing device, or other user computing device.

The user computing device 500, financial institution computer system 600, point of transaction computer system 700, and third party computer system 800 are each configured to communicate with each other over a network 450. The user computing device 500, financial institution computer system 600, point of transaction computer system 700, and third party computer system 800 and are each described in greater detail below with reference to FIGS. 4-7. The network 450 may include a local area network (LAN), a wide area network (WAN), a global area network (GAN), near field communication network, Bluetooth network or any other type of communications network or protocol. In some embodiments, network 450 may comprise the Internet. In addition, network 450 may include first, second, third, and/or fourth-generation cellular communication networks and/or the like. For example, the network 450 may include second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The network 450 may provide for wireline, wireless, or a combination of wireline and wireless communication between devices in the network.

In the embodiment of the invention depicted in FIG. 3, network 450 comprises near field communication ("NFC") network 455, cellular network 460, and Internet 465. In some embodiments of the invention, user computing device 500 communicates with point of transaction computer system 600 over near field communication network 455. For example, user computing device 500 may communicate with point of transaction computer system 700 when user computing device 500 commences a transaction, as described in relation to block 120 of FIG. 1, and/or when user computing device 500 otherwise sends or receives information to/from point of transaction computer system 700. For instance, in some embodiments of the invention, user computing device 500 receives a request to perform a transaction using the system from point of transaction computer system 700. Furthermore, in some embodiments, user computing device 500 sends received user input (or an indication that received user input is correct or not) to point of transaction computer system 700.

In some embodiments, point of transaction computer system 700 communicates with financial institution computer system 600 via Internet 465. For example, point of transaction computer system 700 may communicate with financial transaction computer system 600 when point of transaction computer system 700 uses received user input to proceed with transaction payment authentication, as described in relation to block 160 of FIG. 1, and/or when point of transaction computer system 700 otherwise sends or receives information to/from financial institution computer system 600.

Lastly, in some embodiments user computing device 500 communicates with financial transaction computer system 600 via cellular network 460. For example, user computing device 500 communicates with financial transaction computer system 600 when user computing device 500 uses received user input to determine whether to proceed with transaction payment authentication, as described in relation to block 160 of FIG. 1, and/or when user computing device 500 otherwise sends or receives information to/from financial institution computer system 600. For instance, in some embodiments of the invention, user computing device 500 receives a request to perform a transaction using the system from financial institution computer system 600. Furthermore, in some embodiments, user computing device 500 sends received user input (or an indication that received user input is correct or not) to financial institution computer system 600.

Although in the embodiment of the invention depicted in FIG. 3, point of transaction computer system 700 comprises a payment terminal, in some other embodiments of the invention (which are not depicted in FIG. 3), the payment terminal may be a separate device from point of transaction computer system 700. In those embodiments, user computing device 500 may similarly communicate with the payment terminal via network 450. Additionally, the payment terminal may communicate with point of transaction computer system 700 via network 450.

Referring now to FIG. 4, the user computing device 500 associated with the user 402 is described. FIG. 4 provides a block diagram illustrating user computing device 500 in accordance with embodiments of the invention. In one embodiment of the invention, the user computing device 500 is a mobile telephone. However, it should be understood, however, that a mobile telephone is merely illustrative of one type of user computing device 500 that may benefit from, employ, or otherwise be involved with embodiments of the present invention and, therefore, should not be taken to limit the scope of embodiments of the present invention. Other types of user computing devices 500 may include portable digital assistants (PDAs), pagers, mobile televisions, gaming devices, laptop computers, cameras, video recorders, audio/video player, radio, GPS devices, or any combination of the aforementioned.

The user computing device 500 generally includes a processor 510 communicably coupled to such devices as a memory 520, user output devices 536, user input devices 540, a network interface 560, a power source 515, a clock or other timer 550, a camera 580, and a positioning system device 575. The processor 510, and other processors described herein, generally includes circuitry for implementing communication and/or logic functions of the user computing device 500. For example, the processor 510 may include a digital signal processor device, a microprocessor device, and various analog to digital converters, digital to analog converters, and/or other support circuits. Control and signal processing functions of the user computing device 500 are allocated between these devices according to their respective capabilities. The processor 510 thus may also include the functionality to encode and interleave messages and data prior to modulation and transmission. The processor 510 can additionally include an internal data modem. Further, the processor 510 may include functionality to operate one or more software programs, which may be stored in the memory 520. For example, the processor 510 may be capable of operating a connectivity program, such as a web browser application 522. The web browser application 522 may then allow the user computing device 500 to transmit and receive web content, such as, for example, location-based content and/or other web page content, according to a Wireless Application Protocol (WAP), Hypertext Transfer Protocol (HTTP), and/or the like. A processor may include a digital signal processor device, a microprocessor device, and various analog to digital converters, digital to analog converters, and/or other support circuits.

Control and signal processing functions of the system are allocated between these devices according to their respective capabilities. The processor may also include the functionality to encode and interleave messages and data prior to modulation and transmission.

The processor 510 is configured to use the network interface 560 to communicate with one or more other devices on the network 450. In this regard, the network interface 560 includes an antenna 576 operatively coupled to a transmitter 574 and a receiver 572 (together a "transceiver"). The processor 510 is configured to provide signals to and receive signals from the transmitter 574 and receiver 572, respectively. In some embodiments where network 350 is a wireless telephone network, the signals may include signaling information in accordance with the air interface standard of the applicable cellular system of the wireless telephone network. In this regard, the user computing device 500 may be configured to operate with one or more air interface standards, communication protocols, modulation types, and access types. By way of illustration, the user computing device 500 may be configured to operate in accordance with any of a number of first, second, third, and/or fourth-generation communication protocols and/or the like. For example, the user computing device 500 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user computing device 500 may also be configured to operate in accordance with non-cellular communication mechanisms, such as via a wireless local area network (WLAN), near field communication network, or other communication/data networks.

The network interface 560 may also include a payment network interface 570. The payment network interface 570 may include software, such as encryption software, and hardware, such as a modem, for communicating information to and/or from one or more devices on a network 350. For example, the user computing device 500 may be configured so that it can be used as a credit or debit card by, for example, wirelessly communicating account numbers or other authentication information to point of transaction computer system 600. Authentication information may be or include, for example, a username, a password, a personal identification number (PIN), a passcode, biometric information (e.g., voice authentication, a fingerprint, neural authentication, brainwave scan, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system.

As described above, the user computing device 500 has a user interface that is, like other user interfaces described herein, made up of user output devices 536 and/or user input devices 540. The user output devices 536 include a display 530 (e.g., a liquid crystal display or the like) and a speaker 532 or other audio device, which are operatively coupled to the processor 510. The user input devices 540, which allow the user computing device 500 to receive data from user 402, may include any of a number of devices allowing the user computing device 500 to receive data from a user, such as a keypad, keyboard, touch-screen, touchpad, microphone, mouse, joystick, other pointer device, button, soft key, and/or other input device(s). The user interface may also include a camera 580, such as a digital camera. For example, the user interface may include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

The user computing device 500 may also include a positioning system device 575 that is configured to be used by a positioning system to determine a location of the user computing device 500. For example, the positioning system device 575 may include a GPS transceiver. In some embodiments, the positioning system device 575 is at least partially made up of the antenna 576, transmitter 574, and receiver 572 described above. For example, in one embodiment, triangulation of cellular signals may be used to identify the approximate location of the user computing device 500. In other embodiments, the positioning system device 575 includes a proximity sensor or transmitter, such as an RFID tag, that can sense or be sensed by devices known to be located proximate a merchant or other location to determine that the consumer user computing device 500 is located proximate these known devices.

The user computing device 500 further includes a power source 515, such as a battery, for powering various circuits and other devices that are used to operate the user computing device 500. Embodiments of the user computing device 500 may also include a clock or other timer 550 configured to determine and, in some cases, communicate actual or relative time to the processor 510 or one or more other devices.

The user computing device 500 also includes a memory 520 operatively coupled to the processor 510. As used herein, memory includes any computer readable medium (as defined herein below) configured to store data, code, or other information. The memory 420 may include volatile memory, such as volatile Random Access Memory (RAM) including a cache area for the temporary storage of data. The memory 520 may also include non-volatile memory, which can be embedded and/or may be removable. The non-volatile memory can additionally or alternatively include an electrically erasable programmable read-only memory (EEPROM), flash memory or the like.

The memory 520 can store any of a number of applications which comprise computer-executable instructions/code executed by the processor 510 to implement the functions of the user computing device 500 described herein. For example, the memory 520 may include such applications as a transaction authentication application 521, conventional web browser application 522, a SMS application 523, and email application 524 and/or mobile banking application 525. These applications also typically provide a graphical user interface (GUI) on the display 530 that allows user 402 to communicate with point of transaction computer system 700 and/or financial institution computer system 600. In some embodiments, memory 520 may store financial data 527. Financial data 527 may comprise and data or information relating to transactions of a user, such as credit card information, debit card information, bank account information, and/or information necessary to validate transactions involving the user. In some embodiments, financial data 527 may include the stored information that will be compared to user's inputted received user input to determine if a transaction should be authenticated.

The memory 520 can also store any of a number of pieces of information, and data, used by the user computing device 500 and the applications and devices that make up the user computing device 500 or are in communication with the user computing device 500 to implement the functions of the user computing device 500 and/or the other systems described herein. For example, the memory 520 may include stored data that may be used to verify a user's authentication data, etc. to complete a transaction.

As used herein, a "processor" (such as the processor 510) or a "processing device," generally refers to a device or combination of devices having circuitry used for implementing the communication and/or logic functions of a particular system. For example, a processor 510 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor 510 may further include functionality to operate one or more software programs based on computer-executable program code thereof, which may be stored in a memory. As the phrase is used herein, a processor 510 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory" (such as memory 520) or "memory device," generally refers to a device or combination of devices that store one or more forms of computer-readable media for storing data and/or computer-executable program code/instructions. Computer-readable media is defined in greater detail below. For example, in one embodiment, the memory 520 includes any computer memory that provides an actual or virtual space to temporarily or permanently store data and/or commands provided to the processor 510 when it carries out its functions described herein.

FIG. 5 provides a block diagram illustrating the financial institution computer system 600 in greater detail, in accordance with an embodiment of the invention. As illustrated in FIG. 5, in one embodiment of the invention, the financial institution computer system 600 includes a processing device 620 operatively coupled to a network communication interface 610 and a memory device 650. In certain embodiments, the financial institution computer system 600 is operated by a first entity, such as a financial institution, while in other embodiments, the financial institution computer system 600 is operated by an entity other than a financial institution. As used herein, the term "financial institution" refers to an institution that is associated with the user. Financial institutions can include, but are not limited to, banks, building societies, credit unions, stock brokerages, asset management firms, savings and loans, money lending companies, insurance brokerages, insurance underwriters, dealers in securities, and similar businesses. In some embodiments, the financial institution may be a bank that issued the user's credit card or debit card. In other embodiments, the financial institution may be where the user has a financial institution account. In yet some other embodiments, the term financial institution may refer to a third party that stores information used to authenticate financial transactions involving the user.

It should be understood that the memory device 650 may include one or more databases or other data structures/repositories. The memory device 650 also includes computer-executable program code that instructs the processing device 620 to operate the network communication interface 610 to perform certain communication functions of the financial institution computer system 600 described herein. For example, in one embodiment of the financial institution computer system 600, the memory device 650 includes, but is not limited to, a network server application 660, an authentication application 670, banking application 680, and other computer-executable instructions or other data. In some embodiments of the invention, authentication application 670 performs the task of verifying received user input by comparing the received user input to stored information. The computer-executable program code of the network server application 660, the authentication application 670, or the banking application 680 may instruct the processing device 620 to perform certain logic, data-processing, and data-storing functions of the financial institution computer system 600 described herein, as well as communication functions of the financial institution computer system 600.

In one embodiment, memory device 650 includes financial data 690. Financial data 690 may comprise and data or information relating to transactions of a user, such as credit card information, debit card information, bank account information, and/or information necessary to validate transactions involving the user. In some embodiments, financial data 690 may include the stored information that will be compared to the received user input to determine if a transaction payment should be authenticated. The network server application 660, the authentication application 670, and/or the banking application 680 are configured to access financial data 690 when configured to perform the steps of the present invention.

While the embodiment of the invention depicted in FIG. 5 indicates that financial data 690 is stored in memory device 650 of financial institution computer system 600, in other embodiments of the invention, financial data 690 may be stored in memory devices in other computer systems, including computer systems operated by third parties. In such embodiments, financial institution computer system may still access the financial data 690 through the use of network communication interface 610.

As used herein, a "communication interface" generally includes a modem, server, transceiver, and/or other device for communicating with other devices on a network, and/or a user interface for communicating with one or more customers. Referring again to FIG. 5, the network communication interface 610 is a communication interface having one or more communication devices configured to communicate with one or more other devices on the network 450, such as the user computing device 500 and point of transaction computer system 700. The processing device 620 is configured to use the network communication interface 610 to transmit and/or receive data and/or commands to and/or from the other devices connected to the network 450.

FIG. 6 provides a block diagram illustrating the point of transaction computer system 700 in greater detail, in accordance with an embodiment of the invention. As illustrated in FIG. 6, in one embodiment of the invention, the point of transaction computer system 700 includes a processing device 720 operatively coupled to a network communication interface 710 and a memory device 750. In certain embodiments, the financial institution computer system 700 is operated by a merchant or other commercial entity that may enter into transactions with the user. The point of transaction computer system 700 may additionally referred to as a point of transaction device, as used herein, for processing transactions either from a user's perspective, an entity's perspective, or both. In some instances, the point-of-transaction device (e.g., transaction device) is a user's device, in other instances it is an entity device, and in yet other instances, it refers to both a user device and an entity device interacting to perform a transaction. For example, the point-of-transaction device may refer to a merchant's point-of-transaction terminal, an ATM, a loyalty device such as a rewards card, loyalty card or other loyalty device, a magnetic-based payment device (e.g., a credit card, debit card, and the like), a personal identification number (PIN) payment device, a contactless payment device (e.g., a key fob), a radio frequency identification device (RFID) and the like, a computer, (e.g., a personal computer, tablet computer, desktop computer, server, laptop, and the like), a mobile device (e.g., a smartphone, laptop computer, tablet computer, cellular phone, personal digital assistant (PDA) device, MP3 device, personal GPS device, and the like), a merchant terminal, a self-service machine (e.g., vending machine, self-checkout machine, and the like), a public and/or business kiosk (e.g., an Internet kiosk, ticketing kiosk, bill pay kiosk, and the like), a gaming device, and/or various combinations of the foregoing.

It should be understood that the memory device 750 may include one or more databases or other data structures/repositories. The memory device 750 also includes computer-executable program code that instructs the processing device 720 to operate the network communication interface 710 to perform certain communication functions of the point of transaction computer system 700 described herein. For example, in one embodiment of the point of transaction computer system 700, the memory device 750 includes, but is not limited to, a network server application 760, payment application 770 and an authentication application 780. The computer-executable program code of the network server application 760, the payment application 770, or the authentication application 780 may instruct the processing device 720 to perform certain logic, data-processing, and data-storing functions of the point of transaction computer system 700 described herein, as well as communication functions of the point of transaction computer system 700. In some embodiments, point of transaction computer system 700 may execute payment application 770 to initiate functionality configured to conduct a transaction, such as initiating the functionality that allows a near field communication payment terminal to conduct transactions with a user's computing device. Additionally, in some embodiments, point of transaction computer system 700 may execute authentication application 780 to perform the functionality configured to authenticate a transaction payment, such as receiving user input from a user computing device.

Additionally, as illustrated in FIG. 6, point of transaction computer system 700 also includes payment terminal 730 operatively coupled to processing device 720. In this embodiment of the invention, payment terminal 730 is a NFC payment terminal that allows mobile device 500 to conduct financial transactions using e-wallet functionality. In this embodiment of the invention, payment terminal 730 may be located external to the rest of transaction computer system 700. Although not depicted in FIG. 6, in some embodiments of the invention, payment terminal 730 may include a processor, memory device, and communication interface. In some embodiments of the invention, payment terminal 730 may communicate with mobile device 500 over network 450 independent of network communication interface 710 and in some of these embodiments, information received by payment terminal 730 may be transmitted by network communication interface 710.

FIG. 8 provides a block diagram illustrating the third party computer system 800 in greater detail, in accordance with an embodiment of the invention. As illustrated in FIG. 5, in one embodiment of the invention, the third party computer system 800 includes a processing device 820 operatively coupled to a network communication interface 810 and a memory device 850. In certain embodiments, the third party computer system 800 is operated by a first entity, such as a data storage provider, while in other embodiments, the third party computer system 800 is operated by an entity other than a data storage provider.

It should be understood that the memory device 850 may include one or more databases or other data structures/repositories. The memory device 850 also includes computer-executable program code that instructs the processing device 820 to operate the network communication interface 810 to perform certain communication functions of the third party computer system 800 described herein. For example, in one embodiment of the third party computer system 800, the memory device 850 includes, but is not limited to, a network server application 860, an authentication application 870, third party application 880, and other computer-executable instructions or other data. In some embodiments of the invention, authentication application 870 performs the task of verifying received user input by comparing the received user input to stored information. The computer-executable program code of the network server application 860, the authentication application 870, or the third party application 880 may instruct the processing device 820 to perform certain logic, data-processing, and data-storing functions of the third party computer system 800 described herein, as well as communication functions of the third party computer system 800.

In one embodiment, memory device 850 includes stored data 890. Stored data 890 may comprise and data or information relating to hardware profiles, unique signatures, created keys, and the like. In some embodiments, stored data 890 may include the stored information that will be compared to the received user input to determine if a transaction payment should be authenticated. The network server application 860, the authentication application 870, and/or the third party application 880 are configured to access stored data 890 when configured to perform the steps of the present invention.

While the embodiment of the invention depicted in FIG. 8 indicates that stored data 890 is stored in memory device 850 of third party computer system 800, in other embodiments of the invention, stored data 890 may be stored in memory devices in other computer systems, including computer systems operated by third parties. In such embodiments, third party computer system may still access the stored data 890 through the use of network communication interface 810.

As used herein, a "communication interface" generally includes a modem, server, transceiver, and/or other device for communicating with other devices on a network, and/or a user interface for communicating with one or more customers. Referring again to FIG. 8, the network communication interface 810 is a communication interface having one or more communication devices configured to communicate with one or more other devices on the network 450, such as the user computing device 500 and point of transaction computer system 700. The processing device 820 is configured to use the network communication interface 810 to transmit and/or receive data and/or commands to and/or from the other devices connected to the network 450.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein

What is claimed is:

1. A system for automatic compromise detection of a hardware signature authentication algorithm, the system comprising:
   a computer apparatus including a processor and a memory; and
   a software module stored in the memory, comprising executable instructions that when executed by the processor cause the processor to:
   create a unique signature, using a signature creation algorithm, based at least in part on a hardware profile of the system;
   receive a request, from a user, to perform a transaction using the system;
   in response to receiving the request, determine whether malware has compromised the signature creation algorithm; and
      if so, preventing the signature creation algorithm from creating a key based on the unique signature; and
      if not, allowing the signature creation algorithm to create a key based on the unique signature.

2. The system of claim 1, wherein the signature creation algorithm is stored in the memory prior to creation of the unique signature and is protected, and thereby not writable, subsequent to being stored.

3. The system of claim 1, wherein the executable instructions when executed further cause the processor to:
   determine that malware is present; and
   initiate one or more remediation actions configured to mitigate an impact of the malware or eliminate the malware.

4. The system of claim 1, wherein the executable instructions when executed further cause the processor to:
   determine that malware is present; and
   initiate a malware presence communication, to the user and/or a second system, comprising an indication of the presence of malware on the system.

5. The system of claim 1, wherein determining whether malware has compromised the signature creation algorithm comprises:
   monitoring whether any application or system has accessed the hardware profile of the system;
   if so, determining whether the application or system that accessed the hardware profile was authorized to access the hardware profile:
      if so, determining that no malware has compromised the signature creation algorithm;
      if not, determining that malware has compromised the signature creation algorithm; and
   if not, determining that no malware has compromised the signature creation algorithm.

6. The system of claim 1, wherein determining whether malware has compromised the signature creation algorithm comprises:
   monitoring whether any application or system has accessed predetermined data stored in the memory of the system;
   if so, determining whether the application or system that accessed the predetermined data was authorized to access the predetermined data:
      if so, determining that no malware has compromised the signature creation algorithm;
      if not, determining that malware has compromised the signature creation algorithm; and
   if not, determining that no malware has compromised the signature creation algorithm.

7. The system of claim 1, wherein determining whether malware has compromised the signature creation algorithm comprises:
   monitoring whether any application or system has accessed a predetermined application or algorithm stored in the memory of the system;
   if so, determining whether the application or system that accessed the predetermined application or algorithm was authorized to access the predetermined application or algorithm:
      if so, determining that no malware has compromised the signature creation algorithm;
      if not, determining that malware has compromised the signature creation algorithm; and
   if not, determining that no malware has compromised the signature creation algorithm.

8. A computer program product for providing automatic compromise detection of a hardware signature authentication algorithm, the computer program product comprising:
   a non-transitory computer readable storage medium having computer readable program code embodied therewith, the computer readable program code comprising:
      computer readable program code configured to create a unique signature, using a signature creation algorithm, based at least in part on a hardware profile of the system;
      computer readable program code configured to receive a request, from a user, to perform a transaction using the system;
      computer readable program code configured to in response to receiving the request, determine whether malware has compromised the signature creation algorithm; and
         if so, preventing the signature creation algorithm from creating a key based on the unique signature; and
         if not, allowing the signature creation algorithm to create a key based on the unique signature.

9. The computer program product of claim 8, wherein the signature creation algorithm is stored in the memory prior to creation of the unique signature and is protected, and thereby not writable, subsequent to being stored.

10. The computer program product of claim 8, further comprising computer readable program code configured to:
    determine that malware is present; and
    initiate one or more remediation actions configured to mitigate an impact of the malware or eliminate the malware.

11. The computer program product of claim 8, further comprising computer readable program code configured to:
    determine that malware is present; and
    initiate a malware presence communication, to the user and/or a second system, comprising an indication of the presence of malware on the system.

12. The computer program product of claim 8, further comprising computer readable program code configured to:
    monitor whether any application or system has accessed the hardware profile of the system;
    if so, determining whether the application or system that accessed the hardware profile was authorized to access the hardware profile:
       if so, determining that no malware has compromised the signature creation algorithm;
       if not, determining that malware has compromised the signature creation algorithm; and
    if not, determining that no malware has compromised the signature creation algorithm.

13. The computer program product of claim 8, further comprising computer readable program code configured to:
    monitor whether any application or system has accessed predetermined data stored in the memory of the system;
    if so, determining whether the application or system that accessed the predetermined data was authorized to access the predetermined data:
       if so, determining that no malware has compromised the signature creation algorithm;
       if not, determining that malware has compromised the signature creation algorithm; and
    if not, determining that no malware has compromised the signature creation algorithm.

14. The computer program product of claim 8, further comprising computer readable program code configured to:
    monitoring whether any application or system has accessed a predetermined application or algorithm stored in the memory of the system;
    if so, determining whether the application or system that accessed the predetermined application or algorithm was authorized to access the predetermined application or algorithm:
       if so, determining that no malware has compromised the signature creation algorithm;
       if not, determining that malware has compromised the signature creation algorithm; and if not, determining that no malware has compromised the signature creation algorithm.

15. A computer-implemented method for providing automatic compromise detection of a hardware signature authentication algorithm, the method comprising:
creating, via a computing device processor, a unique signature, using a signature creation algorithm, based at least in part on a hardware profile of the system;
receiving, via a computing device processor, a request, from a user, to perform a transaction using the system;
in response to receiving the request, determining, via a computing device processor, whether malware has compromised the signature creation algorithm; and
if so, preventing, via a computing device processor the signature creation algorithm from creating a key based on the unique signature; and
if not, allowing, via a computing device processor, the signature creation algorithm to create a key based on the unique signature.

16. The computer-implemented method of claim 15, wherein the signature creation algorithm is stored in the memory prior to creation of the unique signature and is protected, and thereby not writable, subsequent to being stored.

17. The computer-implemented method of claim 15, the method further comprising:
determining that malware is present; and
initiating one or more remediation actions configured to mitigate an impact of the malware or eliminate the malware.

18. The computer-implemented method of claim 15, the method further comprising:
determining that malware is present; and
initiating a malware presence communication, to the user and/or a second system, comprising an indication of the presence of malware on the system.

19. The computer-implemented method of claim 15, the method further comprising:
monitoring whether any application or system has accessed the hardware profile of the system;
if so, determining whether the application or system that accessed the hardware profile was authorized to access the hardware profile:
if so, determining that no malware has compromised the signature creation algorithm;
if not, determining that malware has compromised the signature creation algorithm; and
if not, determining that no malware has compromised the signature creation algorithm.

20. The computer-implemented method of claim 15, the method further comprising:
monitoring whether any application or system has accessed predetermined data stored in the memory of the system;
if so, determining whether the application or system that accessed the predetermined data was authorized to access the predetermined data:
if so, determining that no malware has compromised the signature creation algorithm;
if not, determining that malware has compromised the signature creation algorithm; and
if not, determining that no malware has compromised the signature creation algorithm.

* * * * *